United States Patent
Sarbach

[19]

[11] Patent Number: 5,963,890
[45] Date of Patent: Oct. 5, 1999

[54] CONTROL SYSTEMS, ESPECIALLY FOR HEATING, VENTILATING AND/OR AIR CONDITIONING INSTALLATIONS FOR MOTOR VEHICLES

[75] Inventor: Jean-Charles Sarbach, Gallardon, France

[73] Assignee: Valeo Climatisation, La Verriere, France

[21] Appl. No.: 08/865,761

[22] Filed: Dec. 23, 1996

[30] Foreign Application Priority Data

Dec. 27, 1995 [FR] France ................................. 95 15571

[51] Int. Cl.⁶ ........................... G01K 17/00; G06F 15/00
[52] U.S. Cl. ........................... 702/136; 219/202; 62/126; 236/49.3; 701/35
[58] Field of Search ............................ 702/136; 62/126, 62/131, 244; 165/288, 247, 202; 236/49.3, 91 EF; 237/12.3 A, 12.3 B; 219/202, 504, 530; 701/35

[56] References Cited

U.S. PATENT DOCUMENTS

| | | | |
|---|---|---|---|
| 4,774,915 | 10/1988 | Nguyen | 123/179.3 |
| 5,003,785 | 4/1991 | Petri et al. | |
| 5,505,251 | 4/1996 | Sarbach | 165/202 |
| 5,571,432 | 11/1996 | Sarbach | 219/202 |

FOREIGN PATENT DOCUMENTS

| | | |
|---|---|---|
| 0 375 871 | 7/1990 | European Pat. Off. |
| 95/17314 | 12/1993 | WIPO |

OTHER PUBLICATIONS

Patent Abstracts of Japan, vol. 010, No. 171 (M–489), Jun. 17, 1986 & JP–A–61 021816 (Nissan Jidosha KK), Jan. 30, 1986.

Patent Abstracts of Japan, vol. 005, No. 072 (M–068), May 14, 1981 & JP–A–56 021911 (Diesel Kiki Co Ltd), Feb. 28, 1981.

*Primary Examiner*—Kamini Shah
*Attorney, Agent, or Firm*—Morgan & Finnegan, LLP

[57] ABSTRACT

The control means includes a keypad and display unit which is connected to a processing means which includes a user or input memory, a regulation unit for receiving sensed values of parameters, and an output memory for controlling the means whereby the various working parts of the installation are themselves controlled. Regulation of the installation by the control system can be overridden by operation of a special touch pad which acts on an automatic processing circuit, which delivers a blocking command to the output memory, thus "freezing" the contents of the latter. The automatic processing circuit also operates in this way when the ignition key is turned to energise the installation initially. The frozen or blocked mode can be cancelled by operating any of the touch controls on the keypad.

8 Claims, 4 Drawing Sheets

CONTROL SYSTEMS, ESPECIALLY FOR HEATING, VENTILATING AND/OR AIR CONDITIONING INSTALLATIONS FOR MOTOR VEHICLES

FIELD OF THE INVENTION

This invention relates to electronic control systems for heating, ventilating and/or air conditioning installations, in particular for motor vehicles.

BACKGROUND OF THE INVENTION

Electronic control systems for such installations offer many different possibilities for the regulation of the various parameters which affect conditions inside the vehicle, such that the comfort of the users is very significantly improved. With the aid of a device such as a keypad, the users are able to define directly the various elements of the conditions they require for the atmosphere in the cabin, in particular the temperature of the air which is distributed by the installation into the cabin of the vehicle and the pattern of distribution of this air.

The Applicant has however observed that it is desirable to improve the comfort of the users even more, in certain respects. In this connection, when for example a motorist reaches a toll station, the window has to be opened in order for money to change hands. Opening of the window changes the atmospheric conditions within the cabin, and in prior art installations of the above kind, the regulation (adjustments) of the various conditions of the cabin, effected by the installation, tends to over-compensate for the change that results from opening of the window. This over-compensation is far from helpful, having regard to the relative shortness of the time for which the window is open.

In addition, an occupant of a vehicle will generally decide to open the window or the sunroof, and leave it open for a prolonged period, because he knows that by doing so, he will be more comfortable. However, when that happens, the control system of the ventilation or air conditioning installation will then tend to seek a way to compensate exactly for the effects of opening the window or roof. In addition, the operations of making adjustments are accompanied by mechanical actions, which, in spite of the improvements achieved up to the present time, still make themselves evident to the occupants to the vehicle, in terms of variations in airflow and temperature which accompany them, and also in terms of various noises.

DISCUSSION OF THE INVENTION

The object of the present invention is to provide a solution to the above mentioned problem.

This solution starts with a control system, in particular for a heating, ventilating and/or air conditioning system for a motor vehicle, of the type which includes control elements which enable the user to define a set of required atmospheric conditions, together with processing means which are capable of converting the parameters in this set of parameters into adjustment values for adjusting accordingly the various working parts of the installation.

According to the invention, the control system, being of the type that includes setting and display means which enable the user to define and monitor a set of parameters for running atmospheric conditions, and processing means capable of converting the parameters of the said set into appropriate values for adjusting the working parts of the installation in accordance with adjustment criteria, is characterised in that the processing means further include locking means capable of over-riding the regulation of the installation by the control system, by freezing, in response to a blocking command, the said adjustment values for adjusting the working parts of the installation, together with means for managing the control of the locking action, and in that the setting and display means further include a function accessible to the user, for instructing the management means to deliver a blocking command, so that the adjustment values at the instant of blocking are preserved regardless of any changes in the atmospheric conditions in the cabin.

Thus, by freezing the adjustment parameters at their instant values, normal operation of the system to make adjustments is prevented or "blocked", the system therefore being in a "locked" state.

In a preferred embodiment of the invention, the processing means include a memory for memorising running adjustment values, the said memory being locked in response to the blocking command, while the set of running parameters, defining actual or desired atmospheric conditions, is ignored. This locking action of the memory is preferably arranged to persist until it is cancelled by the user.

The above mentioned function accessible to the user can be achieved by means of a manual control element such as a touch control, which is dedicated to blocking the adjustment values, and which is preferably accompanied by a visual indication. The processing means are preferably capable of themselves automatically generating the blocking control on start-up of the installation (for example when the ignition key is turned), which therefore starts on the basis of the adjustments which had previously been blocked but preserved.

When the user cancels the block, which can be commanded by the actuation of one among at least some of the control elements available to the user, the processing means are so arranged as to reestablish the adjustment values corresponding to a set of running parameters which are memorised or preprogrammed.

In one particular embodiment of the invention, the processing means comprise: an automatic processing circuit which defines a regulation or adjustment logic state and a blocking (or blocked) logic state; means for causing the automatic processing unit to pass into the blocked state if the blocking function is exercised in the regulation or adjustment state; and means for causing the automatic processing unit to pass to the regulation or adjustment state in the event of the user actuating one among at least some of the manual control elements during a blocked phase, the automatic processing circuit controlling the priority freezing of the said adjustment values of the working parts of the installation Further features and advantages of the invention will appear more clearly on the reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 4:
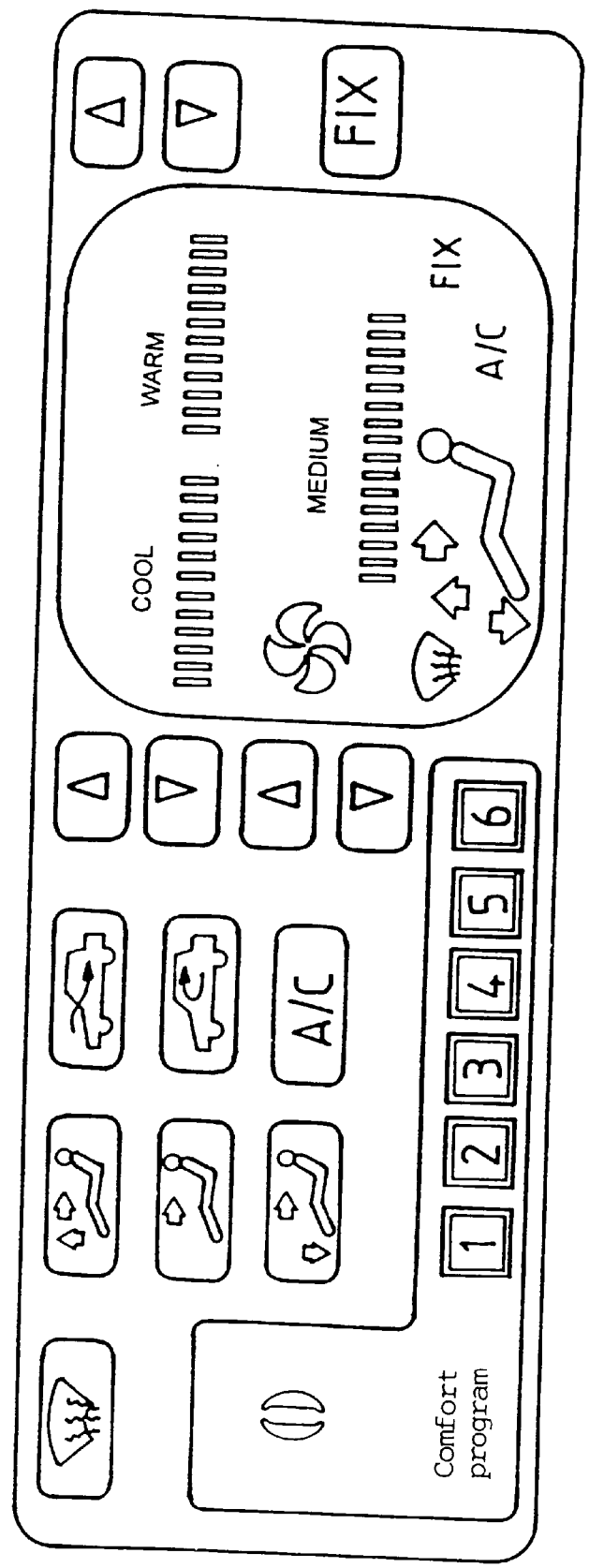
FIG. 4 shows one example of a keypad/display unit for use by the user of the vehicle in the operation of the system according to the invention.

A heating, ventilating and/or air conditioning apparatus includes, in particular, a data unit, or user interface unit, 10,19, which includes a keypad 10 having a number of manual control elements. These manual control elements may be of the push button type, or the rotary type, or of any other known type such as a cursor or touch-sensitive element, here referred to as a touch pad. The purpose of these manual control elements is to define the atmospheric conditions which the user requires in all or part of, for example, the cabin of a motor vehicle. The data unit also includes a visual display 19; the information given on this display reflects the current state of the installation and the actuation of the manual control elements on the keypad 10. The user interface unit is in fact preferably of the combined keyboard-display type (one example of which is shown in FIG. 4), and is for example mounted in the fascia panel of the vehicle between the driver and the front passenger.

The atmospheric conditions referred to above comprise, in particular, the following parameters: the air flow rate derived from a motorised fan or blower unit GMV; temperature, which is controlled by a mixing valve VM situated between the hot air supply and the cold air supply of the installation, together with a heating radiator RAD, where the latter is of an adjustable type, and optionally an air conditioning evaporator CLIM; and the pattern of distribution of the treated air delivered to the cabin, which is controlled by various distribution valves VDi.

The keypad 10 is connected to a user memory 20 which includes at least one zone referred to as a running adjustment zone. A set of parameters $Mu_i$, which together define the desired atmospheric conditions, is memorised in this zone. Following from this, an adjusting or regulation unit 40 defines adjustment values VRi, for use in control of the various mechanical devices GME, RAD, CLIM, VM and VDi, which will for convenience be referred to as the working parts of the installation. These are controlled, including their adjustment as appropriate, by a control means 90, in response to the adjustment values VRi. For this purpose, a correspondence table, into which a set of parameters is entered, may be used. This is a table of correspondence of detected values (represented at 30 in FIG. 1), such as the prevailing cabin inside temperature, optionally the outside temperature, and, if necessary, a feedback parameter responsive to the adjustment values themselves.

Thus, when the user defines, by setting, one or more parameters with the aid of the manual control elements in the keypad 10, these parameters are memorised in the form of a set of running parameters, i.e. values of parameters which are variable by the user or by prevailing conditions, in a given format. This set is then made use of in order to define the adjustment values for the motorised blower unit GNV, the mixing valve VM, where appropriate the heating radiator RAD and evaporator CLIM, and the various distribution valves VDi.

Preferably, the memory 20 also contains several programming zones for receiving sets of parameters of the same nature as the set of running parameters, these sets being defined in advance by the user or in any other way. Manual elements which are referred to here as manual programming elements enable one of these programmed modes to be activated as a set of running parameters. The user may for example, put in the memory the set of running parameters as a set of programmed parameters.

Such a system enables the user to programme adjustments which are adapted to his metabolism, or to programme several comfort levels, or even to programme a rapid convergence (using a strong airflow), or a slow convergence using a weak airflow, towards the desired conditions; again, it enables the user to program adjustments which take account of smoking by occupants of the vehicle.

However, in certain particular situations, the richness and flexibility offered by these arrangements are offset by the drawbacks, real if minor, which were explained above under the general heading "Background of the Invention".

Figure 1:
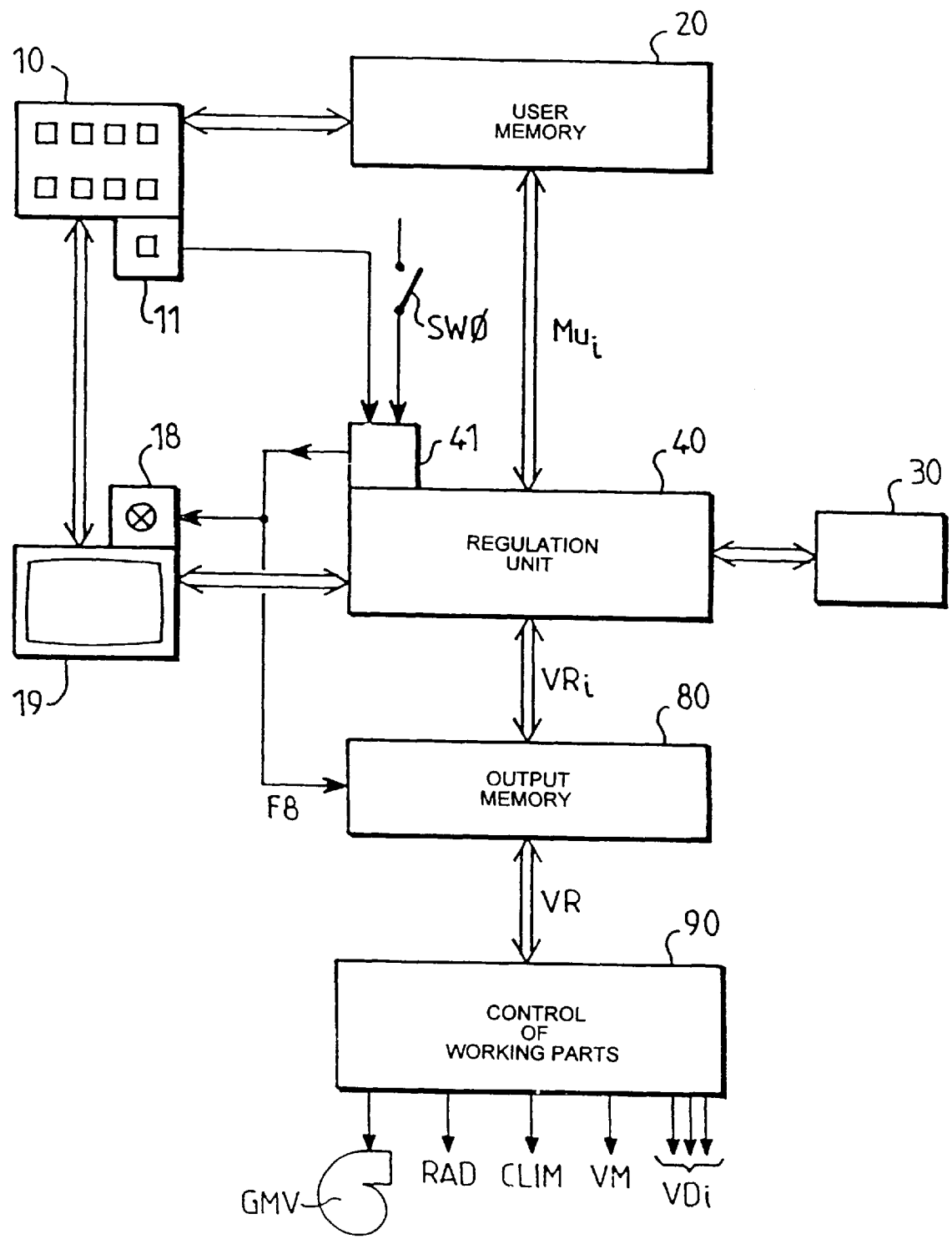
FIG. 1 is a block diagram illustrating the principal of the control system for a heating, ventilating and/or air conditioning installation.

Accordingly, in the system illustrated in FIG. 1, a dedicated touch pad 11, which will be referred to as a "FIX" touch pad, is added to the keypad 10. Corresponding to the touch pad 11, a visual indicator 18, which is lit when the FIX function is in service, is associated with the visual display 19.

The adjustment values for the working parts are memorised in an output memory 80, which gives output signals VR that serve as commands for the control means 90.

An automatic processing circuit 41 is provided adjacent to, and connected, the regulation unit 40. The automatic processing unit 41 is capable of acting on the output memory 80, so as to "freeze" its contents, either through a direct blocking input F8 provided in the memory as shown, or through an AND gate (not shown), which would condition the re-activation of the memorised information. In this "frozen" mode, the visual indicator 18 is activated.

The block diagram in FIG. 1 shows the memory 80 as an output memory. This does not mean that it is necessarily located physically on the output side of the regulation unit 40. Any internal memory of the unit 40 which determines the adjustment values may be frozen in order to perform the function of the memory 80. Inhibition of the adjustment computations in the unit 40 would achieve the same purpose.

The automatic processing circuit 31 reacts to the operation of a manual control element such as a touch pad, and preferably it reacts to the heating and ventilation being switched on in the first place, this being represented by closure of the ignition switch SWO.

Figure 2:
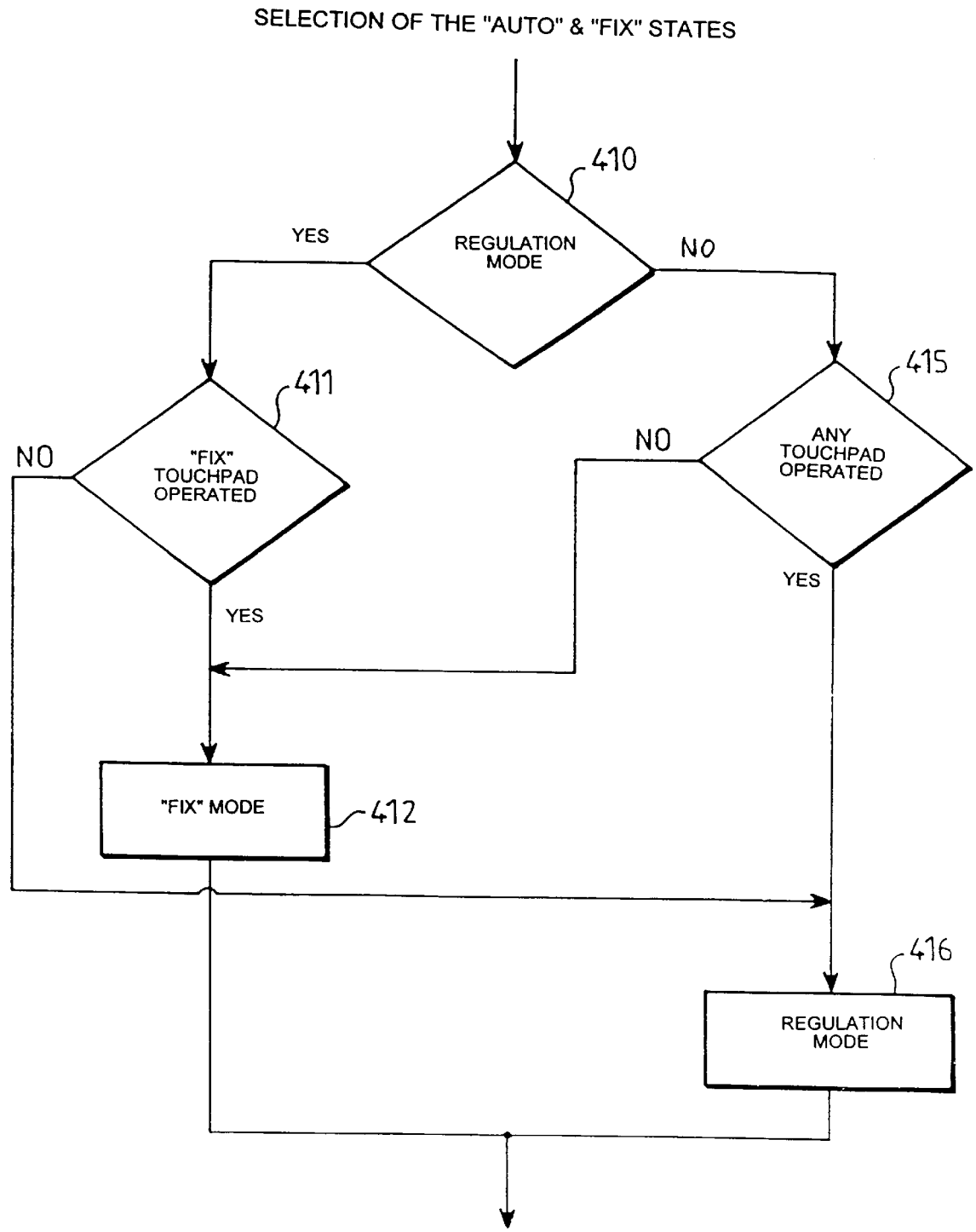
FIG. 2 is a first operating diagram for a first automatic processing or management circuit for putting the invention into practice.
Figure 3:
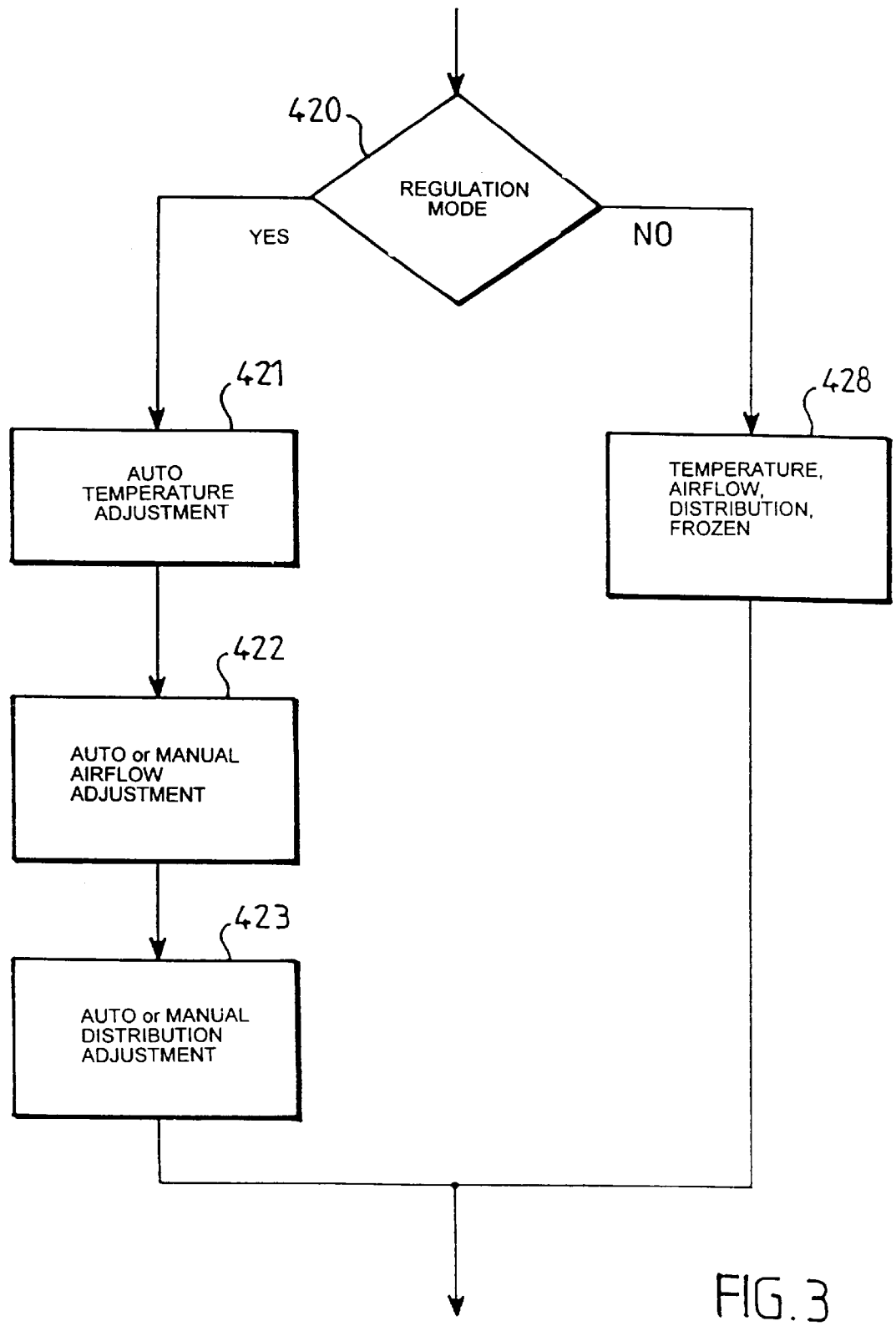
FIG. 3 is a second operating diagram for the automatic processing circuit.

Reference is now made to FIGS. 2 and 3, which illustrate respectively, the management function and effect of the automatic processing circuit 41, on the basis that it is a device having two states, namely an "adjustment" or "regulation" state and a "FIX" state, only one of exists true at any instant.

In FIG. 2, a test 410 determines whether the prevailing state is that of regulation (adjustment). If so, operation of the FIX touch pad, represented at 411, determines a change to the FIX state at 412. In default of this, the system remains in the regulation mode as represented at 416. If the prevailing state of the system is not that of regulation, and is therefore the FIX state, then operation of any touch pad whatsoever, represented at 415, causes a reversion to the regulation mode. In default of this, the system remains in the FIX mode as indicated at 412. In this connection, it is desirable to limit the number of touch pads monitored at 415 to a sub-assembly of the touch pad of the keypad 10. In particular, the FIX touch pad itself could be excluded.

Referring to FIG. 3, in the regulation mode now takes the form of: automatic adjustment of temperature, represented at 421; the automatic or manually controlled adjustment of the airflow, represented at 422; and the automatic or manually controlled adjustment of air distribution, represented at 423. By contrast, in the FIX mode, or state, the adjustment values of temperature, airflow and air distribution remain frozen as indicated at 428.

Reference is now made to FIG. 4, which illustrates, purely by way of example, one keypad-display unit used in a system such as that described above. The L-shaped panel in the lower left hand part of the screen contains a display showing the programmed running mode, if necessary, above the touch pads for selecting pre-recorded programs. In the upper left-hand part of the screen, seven touch pads are provided for selecting the following parameters: windshield; cabin; use or otherwise of recycled air; and air conditioning (A/C). In the right-hand part of the screen, a rectangular display (or main display) shows, at the bottom, the conditions which result from operation of the above mentioned seven touch pads in the upper left-hand part of the screen; while in the upper part of the main display the temperature settings in two zones are shown, together with the blower output rate. The selections of corresponding parameters are if necessary accessible by means of three pairs of cursor-type touch pads, with "up" and "down" symbols, shown in FIG. 4 as flanking the main display.

The FIX touch pad will be noticed in FIG. 4, together with the corresponding indication (18 in FIG. 1), which is here incorporated in the main display. The FIX function overrides any variations in the adjustment of temperature and/or airflow rate. This enables a window to be opened without having any detrimental effect in terms of heat or airflow. On the contrary, the user can enjoy the effect resulting from opening a window, or the sun roof, whether these are open for a short time or a long time. This result is also useful in heavy traffic conditions.

During this period, the symbol FIX appears on the main display. The previous programme is no longer shown, or is shown as being zero. The information about the state of the system remains displayed. Operation of a touch pad enables the user to retrieve either the previous state or a programmed state, or to set up a fresh state of the system.

Although the FIX function has general application, it is of particular value in connection with highly automated modes of operation, in which regulation (adjustment) can be adapted to numerous changes in successive adjustments in order to correct the effects of a change related to the cabin or the driving of the vehicle.

The invention is not limited to the embodiment described above, but embraces all variations which the person in the art would be capable of developing within the scope of the appended claims. It may for example be envisaged that only some of the adjustment values are frozen. Another possible variation would involve exiting from the FIX mode by operating the FIX touch pad, which would then operate in a flip-flop mode.

What is claimed is:

1. A control system for a vehicle heating and ventilating installation, the control system including setting and visualising means for permitting a user of the vehicle to define a set of parameters for required running atmospheric conditions, and processing means connected with the setting and display means for converting the values of parameters of the said set into adjustment values for application to working parts of the installation, whereby to adjust the latter in accordance with adjustment criteria, wherein the system includes management means for issuing a blocking command, the processing means further including locking means responsive to said blocking command for overriding, with priority, said adjustment values, the setting and display means further including means accessible to the user for commanding said management means to issue a said blocking command, whereby the adjustment values prevailing at the instant of blocking action are preserved regardless of any changes in the atmospheric changes in the vehicle.

2. A system according to claim 1, wherein the locking means comprise a memory for memorising running adjustment values, said management means being adapted to freeze the said memory in response to the blocking command, and the system being adapted to then ignore the adjustment values corresponding to the a set of running parameters defining atmospheric conditions.

3. A system according to claim 1, wherein the means accessible to the user comprises a manual touch element dedicated to the blocking of the said adjustment values.

4. A system according to claim 1, wherein the said management means are adapted to react to starting up of the installation by automatically implementing the blocking command.

5. A system according to claim 1, wherein the said management means are adapted to maintain locking of the system by keeping the said adjustment values frozen until the blocking command is cancelled by the user, the system being adapted so as, once said cancellation takes place, to activate the adjustment values corresponding to a set of memorised running parameters.

6. A system according to claim 5, wherein the said management means affect cancellation of the block in response to actuation by the user of one among at least some of the manual control elements of the setting and display means.

7. A system according to claim 6, wherein the said management means comprise an automatic processing circuit defining a regulation logic state and a blocked logic state, means for causing the said automatic processing circuit to pass to the blocked state if the blocking function is excited during the regulation state, and means for causing the automatic processing circuit to pass to the regulation state when one among at least some of the manual control elements available to the user is actuated during the blocked state, the said automatic processing circuit controlling the priority freezing action of the said adjustment values for adjustment of the working parts of the installation.

8. A system according to claim 1, for controlling a said installation which includes a blower, temperature regulating means, and distribution means for distributing air treated in the installation, wherein the said adjustment values include at least one rate of airflow delivered by the blower, the state of said temperature regulating means, and the state of the said distribution means.

* * * * *